United States Patent [19]

Beaston

[11] Patent Number: 4,856,683

[45] Date of Patent: Aug. 15, 1989

[54] HERBICIDE DISPENSER

[75] Inventor: Brook J. Beaston, Wichita, Kans.

[73] Assignee: Great Plains Industries, Inc., Wichita, Kans.

[21] Appl. No.: 140,020

[22] Filed: Dec. 31, 1987

[51] Int. Cl.4 ............................................. B65D 88/54
[52] U.S. Cl. .................................... 222/318; 222/383; 366/137; 239/127
[58] Field of Search ............... 222/318, 372, 385, 383, 222/380; 239/124, 127; 417/307, 308, 540, 542; 137/540, 514.3, 514.7; 366/136-137, 159

[56] References Cited

U.S. PATENT DOCUMENTS

| | | | |
|---|---|---|---|
| 2,692,798 | 10/1954 | Hicks | 366/137 X |
| 3,268,122 | 8/1966 | Berman | 222/318 X |
| 3,310,237 | 3/1967 | Welch | 239/127 |
| 3,776,260 | 12/1973 | Ruddick | 137/321 |
| 3,819,303 | 6/1974 | Pfleger | 417/305 |
| 3,894,690 | 7/1975 | Hill | 239/126 |
| 3,939,860 | 2/1976 | Golding | 137/212 |
| 3,969,608 | 7/1976 | Day | 239/127 X |
| 4,142,658 | 3/1979 | Golding | 222/400.7 |
| 4,305,421 | 12/1981 | Fallon | 137/322 |
| 4,723,710 | 2/1988 | Lucore, II | 239/124 |

*Primary Examiner*—Michael S. Huppert
*Attorney, Agent, or Firm*—Bill D. McCarthy

[57] ABSTRACT

A dispensing system including a tank and a constant displacement pump mounted on the tank for dispensing liquid from the tank. Liquid is withdrawn from the tank via an adapter mounted in the tank bung and having two concentric tubular members, the inner of which receives a tube connected to the pump inlet. A standpipe extends downwardly from the inner tubular member so that liquid is withdrawn from lower portions of the tank. A bypass bore, containing a pressure relief valve, is formed in the pump body between the pump outlet and a recirculation port to return liquid from the pump outlet to the recirculation port when a valve on a delivery line from the pump is closed. The recirculation port is fluidly connected to the outer tubular member of the adapter to return the liquid to the tank.

7 Claims, 4 Drawing Sheets

HERBICIDE DISPENSER

BACKGROUND OF THE INVENTION

1. Field of the Invention

The present invention relates generally to apparatus for dispensing a liquid, and more particularly but not by way of limitation, to apparatus for dispensing a herbicide.

2. Discussion

In recent years, farmers have used herbicides to make the task of controlling unwanted plant growth more efficient and the use of such chemicals, along with the use of fertilizers, has played an important part in increasing the output of American agriculture. With the growth of the world's population, it can be expected that these chemicals will continue to be used as a means of attaining crop yields that must be achieved if famine is to be avoided.

However, these chemicals can cause damage if care is not exercised over their release into the environment. Because of this need to control the release of herbicides, such chemicals are no longer provided in small containers which can be discarded after the herbicide has been transferred to a system utilized to apply the herbicide to plants in the field. Rather, herbicide is now supplied in tanks that contain a large quantity of the herbicide for use over a long period of time, and these tanks can be refilled as the needs of a farmer require.

The use of large, refillable tanks in the supply of herbicide to the farmer, while necessary for the protection of the environment, has caused a problem stemming from the length of time that the tanks will contain the herbicide while the supply is drawn down by use. Herbicides are supplied in the form of a high concentration of particulate matter suspended in a liquid and the suspension is diluted with water prior to application to the fields. Thus, the farmer can dilute the herbicide to a concentration that is appropriate to the job at hand by metering the herbicide into a mixing tank that is part of the equipment for applying the herbicide. The problem that has arisen is that the particulate component of the herbicide tends to settle so that the concentration of the particulate component varies throughout the tank in which the herbicide is stored. This variation can result in a substantial increase in agricultural expense. If the herbicide drawn from the tank has too high a concentration of the active particulate matter, it will be applied in an amount that is in excess of that needed. Since herbicides are expensive, overuse of the herbicide can have a serious effect on farm economy. If the herbicide drawn from the tank has too low a concentration, it may be necessary to repeat the application of the herbicide to the field, thereby wasting labor as well as herbicide.

SUMMARY OF THE INVENTION

The present invention provides a dispensing system that thoroughly mixes a liquid in a tank prior to dispensing the liquid from the tank. To this end, the dispensing system of the present invention is comprised of a tank that is adapted to support a pump that draws liquid via a tank bung adapter leading to lower portions of the tank, and on a selective basis, dispenses the liquid or recirculates it to the tank. In particular, the pump is provided with a bypass bore between the pump outlet and a recirculation port that communicates to upper portions of the interior of the tank via the adapter, and the bypass bore contains a relief valve that opens to bypass liquid at the outlet port to the recirculation port, and thence back to the tank, when a valve on a delivery line from the pump is closed. Since the liquid is drawn from lower portions of the tank in which the particulate component of the herbicide will be concentrated by settling, a few minutes of recirculation achieved by merely closing the valve will result in even mixing of the particulate matter with the liquid of the tank so that the concentration of the herbicide subsequently delivered will be known and can form a reliable basis for dilution.

An additional feature of the present invention is a sealing assembly forming a portion of the adapter that seals the adapter when the pump is removed from the tank.

An object of the present invention is to provide a dispensing system for a liquid containing suspended particulate matter that eliminates variations in the concentration of the suspended matter occasioned by settling of the suspended matter between dispensing operations.

Another object of the invention is to eliminate waste of herbicide used in farming operations.

Yet another object of the invention is to provide a dispensing system that minimizes the possibility of leakage from the system that might occur should the tank be overturned with the pump removed.

Other objects, advantages and features of the present invention will become clear from the following detailed description of a preferred embodiment of the invention when read in conjunction with the drawings and appended claims.

DESCRIPTION

Figure 1:
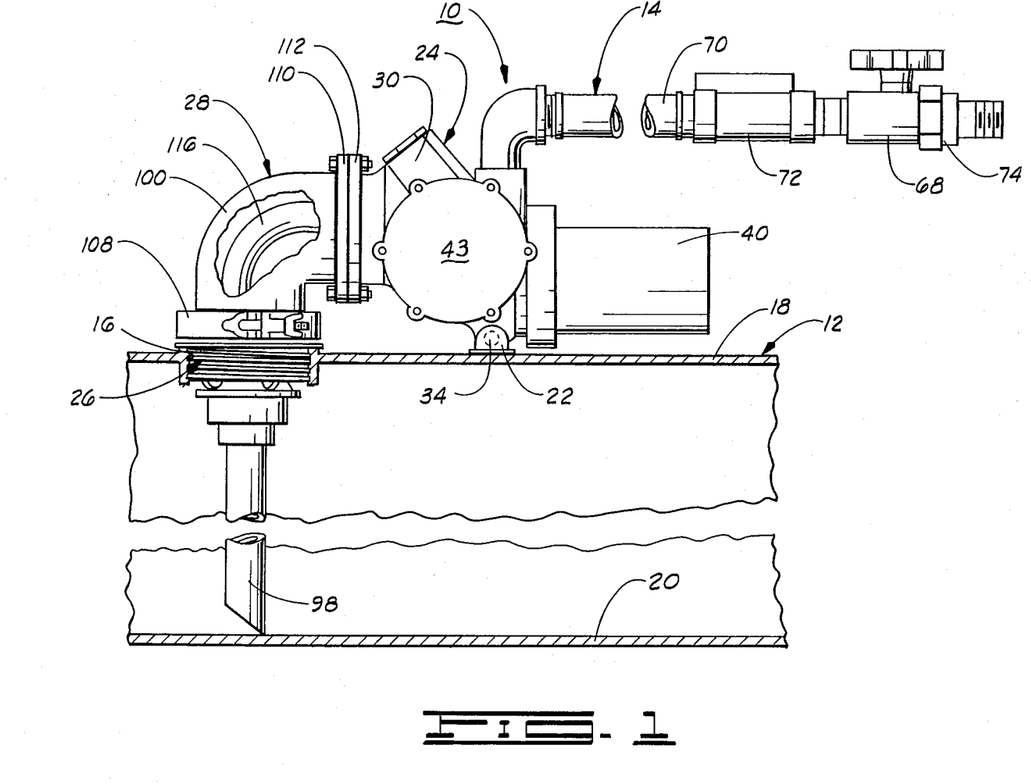
FIG. 1 is a side elevational view in partial cross section and partial cutaway of a dispensing system constructed in accordance with the present invention.

Referring now to the drawings in general and to FIG. 1 in particular, shown therein and designated by the general reference 10 is a system constructed in accordance with the present invention for dispensing a liquid containing suspended particulate matter. In general, the system 10 is comprised of a tank 12 which contains the liquid to be dispensed and a liquid delivery assembly 14 which delivers the liquid upon demand, and additionally, can be operated in a manner discussed below that will insure that the concentration of particulate matter in the liquid will not vary from one dispensing operation to the next.

In order to provide for the introduction and withdrawal of liquid from the tank 12, the tank 12 is provided with a threaded bung 16 that is formed in an upper wall 18 of the tank 12, and for a purpose discussed below, it is contemplated that liquid will be withdrawn from lower portions of the tank 12; that is, from regions of the interior of the tank adjacent the lower wall 20 thereof. A bracket 22 is fixed to the exterior of the upper wall 18 of the tank 12 to facilitate mounting of the liquid delivery system 14 on the tank 12.

The liquid delivery assembly 14 is generally comprised of: a constant displacement pump 24 that has been adapted for use in the system 10; a bung adapter 26 that screws into the bung 16 of the tank 12 and is constructed as will be discussed below to separate fluid flow to and from the tank 12 into two separate fluid flow paths; and a tubing assembly 28 that provides fluid communication between the bung adapter 22 and the pump 24.

With the exception of adaptations that will be discussed below, the pump 24 is a conventional constant displacement pump; that is, a pump which draws in and delivers a fixed volume of liquid for each operating cycle thereof. In particular, the pump 24 can be a reciprocating piston type pump such as the pump that has been illustrated in copending U.S. patent application Ser. No. 112,536 filed Oct. 21, 1987, and assigned to the assignee of the present invention. An example of such a pump is model number VP12CG currently available from Great Plains Industries, Inc. in Wichita, Kans. To place the adaptations in context, it will be useful to first briefly point out pertinent features of pump 24 that are conventional as well as selected features that have been disclosed in the above-referenced U.S. Patent Application.

Figure 2:
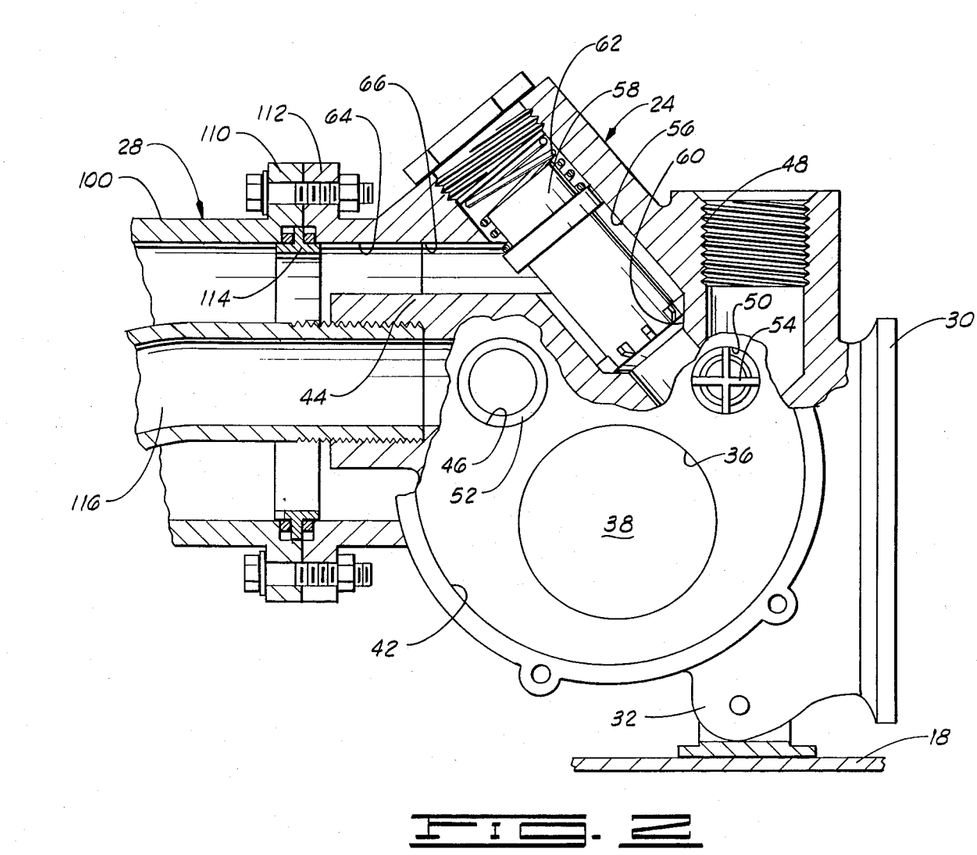
FIG. 2 is a fragmentary cross section on an enlarged scale of the pump and tubing assembly of the dispensing system

With continuing reference to FIG. 1 and with additional reference to FIG. 2, the pump 24 is comprised of a pump body 30 having a depending apertured lug 32 that mates with the bracket 22 so that the pump 24 can be mounted on the tank 12 via a bolt 34 that passes through the lug 32 and the backet 22. A transverse bore 36 is formed laterally through the pump body 30 to receive a bilaterally symmetric piston 38 that is reciprocated in the bore 36 via a conventional cam system (not shown) that extends into the piston 38 and is rotated by a motor 40 mounted on the pump body. As shown for one side of the pump 24, depressions 42, intersected by the bore 36, are formed in the sides of the pump body and, with end caps, these depressions 42 provide the pump 24 with two pumping chambers on opposite sides of the pump. (Structures illustrated for one side of the pump 24 are duplicated on the other side of the pump 24 to provide the pump 24 with a continuous flow capability.)

The pumping chambers are communicated with an inlet port 44 of the pump body 30 via a transverse bore 46 that intersects the inlet port 44 and each of the depressions 42 formed in the sides of the pump body 30. Similarly, the pump body has an outlet port 48 that is communicated with the pumping chambers by a transverse bore 50. Two conventional checkvalves, one of which has been schematically illustrated in the drawings and designated by the numeral 52 therein, are mounted in the bore 46, each checkvalve being positioned between the inlet port 44 and one of the pumping chambers formed by the depressions 42 in the sides of the pump body 30. The checkvalves 52 are positioned in the bore 46 to provide unidirectional flow from the inlet port 44 to the pumping chambers. Similarly, the bore 50 contains checkvalves 54, only one of which has been illustrated, that provide unidirectional flow from the pumping chambers to the pump outlet port 48.

When the motor 40 is operated, the piston 38 is reciprocated in the bore 36 to draw liquid from the inlet port 44 into one of the pumping chambers via one of the checkvalves 52 while concurrently forcing liquid in the other pumping chamber into the outlet port 48 via one of the checkvalves 54. Thus, for each cycle of operation, a quantity of liquid is drawn into each of the pumping chambers, and on an alternative basis, forced into the outlet port 48 for delivery of the liquid from the pump.

In the practice of the present invention, a bypass bore 56 is formed in the pump body 30 to intersect the outlet port 48 in the manner that has been disclosed in the above-referenced U.S. Patent Application, and the bypass bore 56 contains a pressure relief valve comprised of a piston 58 that is biased against a seat 60 at the end of the bore 56 adjacent the outlet port 48 by a spring 62. (The piston 62 can be constructed to include an internal cavity opening toward the outlet port 48 and containing a spring-loaded piston in the manner that has been disclosed in the above-referenced U.S. Application.)

To adapt the pump 24 to the present invention, the pump 24 is provided with a recirculation port 64 that has the form of an annular groove extending coaxially about the inlet port 44, and the end of the bypass bore 56 opposite the seat 60 is in fluid communication with the recirculation port 64 via a bore 66. It will thus be apparent that liquid drawn into the pump 24 can exit the pump 24 along either of two routes. If the fluid pressure in the outlet port 48 is below a value selected by the choice of the spring 62, the piston 58 will be forced against the seat 60 by the spring 62 and fluid will be delivered from the outlet port 48; if such pressure is above the selected value, the fluid pressure in the outlet port will overcome the force exerted by the spring 62 to move the piston 58 out of contact with the seat 60 so that liquid will escape about the piston 58 to the recirculation port 66 for return to the tank 12, as will be discussed below. In the practice of the invention, the route of escape of the liquid drawn into the pump 24 can be made conveniently selectable by mounting a conventional ball valve 68 in a delivery line 70 connected to the pump outlet port 48 for delivery of liquid in the tank 12 to equipment with which the system 10 might be used. As shown in FIG. 1, the delivery line 70 can also be provided with a conventional flow meter 72 to permit metering of the liquid from the tank 12, and a quick release coupling 74 can be attached to the downstream side of the valve 68 to facilitate connection of the system 10 to such other equipment.

Figure 3:
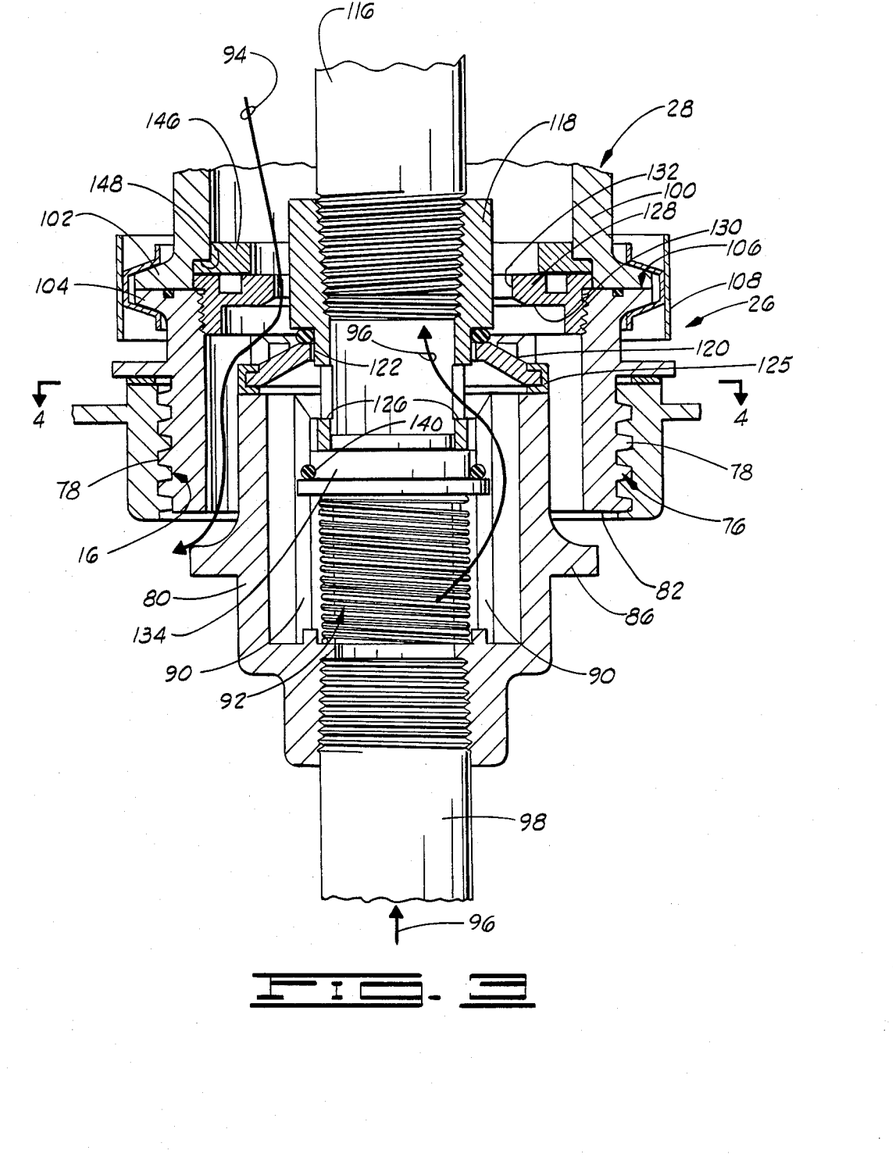
FIG. 3 is a cross section in side elevation of the bung adapter and portions of the tubing assembly of the dispensing system.
Figure 4:
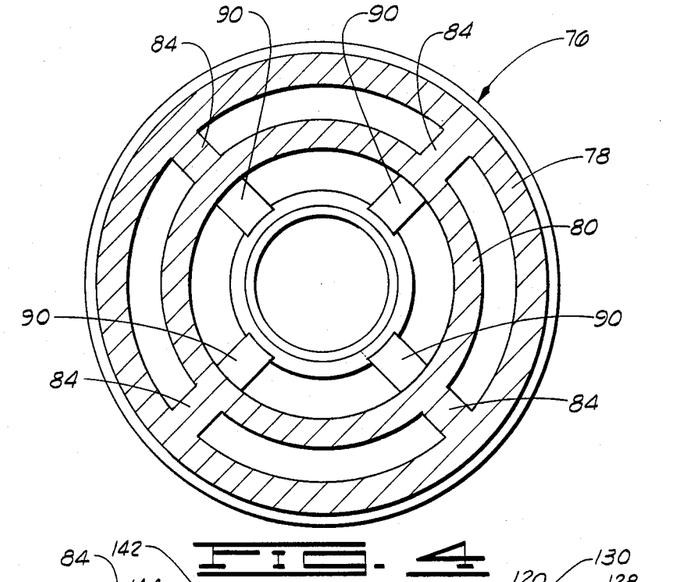
FIG. 4 is a transverse cross section of the bung adapter body.
Figure 5:
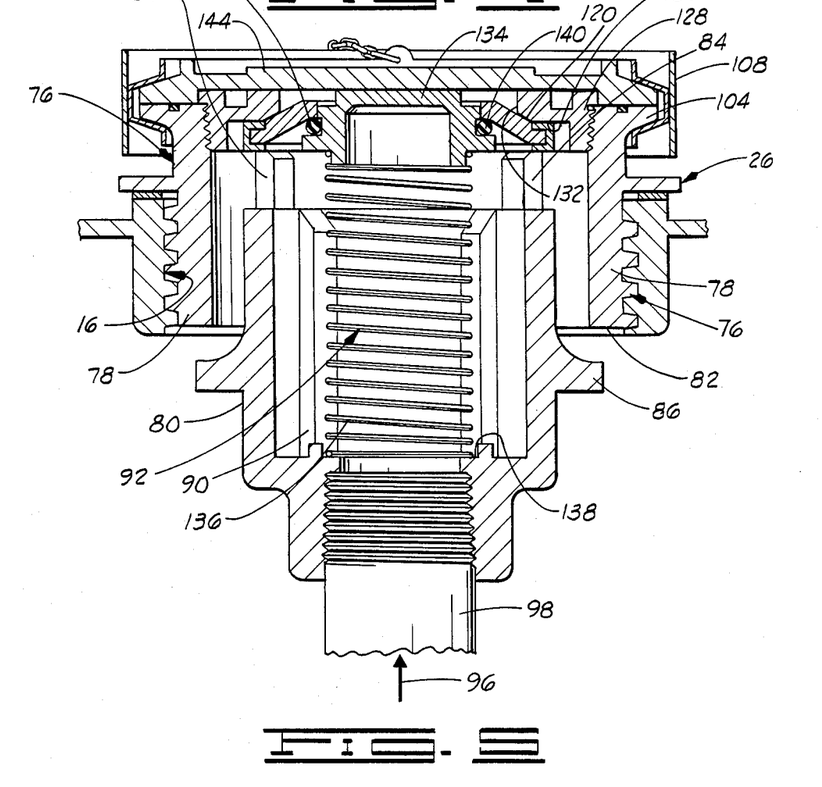
FIG. 5 is a cross section in side elevation of the bung adapter with the tubing assembly removed.

The bung adapter 26 has been particularly illustrated in FIGS. 3 to 5, to which attention is now invited. Initially, it should be noted that it can be expected that the pump 24 and tubing assembly 28 will occasionally be removed from the tank 12, and the bung adapter 26 has been constructed to provide for the eventuality that the tank 12 might, for a period of time, contain liquid while the pump and tubing assembly are removed therefrom. In order to discuss this construction, the bung adapter has been illustrated in the configuration that it will assume at such times that the pump and tubing assembly have been removed (FIG. 5), as well as in the configuration it will assume when the system 10 is ready for use (FIG. 3).

As shown in FIGS. 3 and 5, the bung adapter 26 is comprised of an adapter body 76 that, in turn, is comprised of a first tubular member 78 that is externally threaded so that the adapter body 76 can be screwed into the bung 16, and a smaller diameter second tubular member 80 that extends into the lower end 82 of the first tubular member 78 from the interior of the tank 12. Preferably, the adapter body 76 is constructed of an organic polymer by casting it in one piece with ribs 84 (FIGS. 4 and 5) connecting the two tubular members 78 and 80 and positioning them in a concentric disposition. For a purpose discussed below, a flange 86, having an outwardly flaring upper surface, is formed on portions of the second tubular member 80 below the lower end 82 of the first tubular member 76. Additionally, a plurality of ribs 90 are formed on the inner periphery of the second tubular member 80 to form a guide for a closure assembly, generally designated by the reference numeral 92 that will also be discussed below.

The construction of the adapter body 76 in the form of two concentric tubular members provides the system 10 with two flow paths into and out of the tank 12, a first flow path, generally indicated by the arrow 94, through the annulus between the tubular members and a second flow path, generally indicated by the arrow 96, through the bore of the second tubular member 80. As will be discussed shortly, the tubing assembly 28 extends the flow paths 94 and 96 to the recirculation port 64 and inlet port 44, respectively, of the pump 24, and a standpipe 98 screwed into the lower end of the first tubular member 76 extends the second flow path 96 to lower portions of the tank 12, the standpipe 98 having a length that is selected to dispose the lower end thereof adjacent the lower wall 20 of the tank 12 as has been illustrated in FIG. 1.

To extend the flow paths 94 and 96 to the pump 24, the tubing assembly 28 is comprised of a first connecting tube 100 having a flaring flange 102 on one end thereof to mate with a similar flaring flange 104 on the upper end 106 of the first tubular member 78 so that the connecting tube 100 can be mated with the upper end of the first tubular member 78 via a conventional clamp 108. The opposite end of the first connecting tube 100 has a circumferentially extending flange 110 that mates with a similar flange 112 formed on the pump body 30 and extending about the recirculation port 64 so that the first connecting tube 100 can be bolted to the pump body 30 as illustrated in FIGS. 1 and 2. The connecting tube 100 and the pump body 30 are provided with annular shoulders at the juncture of the flanges 110 and 112 to receive a seal member 114 that prevents leakage between the flanges 110 and 112 and an 0-ring seal (not numerically designated in the drawings) similarly prevents leakage between the flanges 102 and 104.

Internally of the first connecting tube 100 and extending concentrically therewith, the tubing assembly 28 is comprised of a second connecting tube 116 having one end screwed into the inlet port 44 as shown in FIG. 2. The second connecting tube extends through the first connecting tube to the bung adapter 26 and is capped with a tubular coupler 118 that screws onto the end of the tube 116 and has a downwardly facing shoulder formed thereon to engage an O-ring disposed atop a sealing ring 120, that forms a portion of the bung adapter 26, as shown in FIG. 3.

As also shown in FIG. 3, the sealing ring 120 has a central aperture 122 that is sized to slide on lower portions of the coupler 118, and the shoulder on the coupler 118 is positioned so that, at such times that the pump and tubing assembly are mated with the tank, the shoulder on the coupler 118 will force the sealing ring 120 into engagement with the upper end 124 of the second tubular member 80 of the adapter body 76.

An elastomeric sealing member 125, having a U-shaped cross section, is mounted on the outer circular periphery of the sealing ring 120 to provide a seal between the two flow paths 94 and 96 in such position of the sealing ring 120. A plurality of apertures 126 are formed through lower portions of the wall of the coupler 118 to fluidly communicate the interior of the second connecting tube 116 with the interior of the second tubular member 80 so that the standpipe 98, the second tubular member 80 and the connecting tube 116 form an inlet conduit that extends from lower portions of the tank 12 to the inlet port 44 of the pump 24. Similarly, the first tubular member 78 and the first connecting tube 100 form a recirculation conduit from the recirculation port 64 of the pump 24 to upper portions of the interior of the tank 12.

As noted above, the bung adapter 26 assumes a configuration shown in FIG. 5 at such times that the pump 24 and tubing assembly 28 are removed form the tank 12. In this configuration, the bung adapter 26 is provided with an automatic closure capability that will insure that no spillage of liquid in the tank 12 can occur should, for example, the tank 12 be overturned with the pump and tubing assembly dismounted. To provide this capability, upper portions of the first tubular member 78 are internally threaded, and the bung adapter 26 is further comprised of a seat ring 128 that screws into the upper end 106 of the first tubular member 78 and has an internal, annular flange (not numerically designated in the drawings) on the underside of which is formed a seating surface 130. The seating surface 130 overlays the sealing member 125 of the sealing ring 120 so that engagement of the seating surface 130 by the sealing ring 120 will effect a partial closure of the upper end of the bung adapter 26. In order to provide for fluid flow along the flow path 94 during operation of the system 10, the flange of the seat ring 128 defines a central aperture 132 larger than the maximum diameter of the coupler 118 so that complete closure of the tank requires closure of the aperture 132 as well as seating of the sealing ring 120 against the seating surface 130. These functions are provided by the above-mentioned closure assembly 92 in a manner shown in FIG. 5.

As shown in FIG. 5, the closure assembly 92 is comprised of a piston 134 that is adapted to enter the interior of the second tubular member 80 and guided for axial sliding movement therein by the ribs 90. (As shown in FIGS. 3 and 5, the ribs 90 are provided with inwardly sloping upper ends to insure that the piston 134 will enter the second tubular member 80 when the coupler 118 is inserted into the adapter 26.) Alternatively, the piston 134 can be extended from the second tubular member 80 by a compression spring 136 that is disposed in the interior of the second tubular member 80 between the piston 134 and a shoulder 138 formed in the bore of the member 80 near the lower end thereof. Upper portions of the piston 134 are sized to mate with the aperture 122 through the sealing ring 120, and an O-ring 140 mounted atop a circumferential flange on the piston 134 engages the underside 142 of the sealing ring 120 when the piston 134 is extended so that extension of the piston 134 will drive the sealing ring 120 against the seating surface 130 and drive the O-ring 140 against the underside 142 of the sealing ring 120 to form a complete seal of the upper end of the bung adapter 26.

The seal closure of the upper end of the bung adapter 26 can be enhanced, should the tank be transported with the pump and tubing assembly removed therefrom, by a cap 144 having an edge shaped to conform to the flange 102 of the connecting tube 100 so that the cap 144 can be secured atop the first tubular member 78 with the clamp 108. Additionally, and as shown in FIG. 3, the sealing between the bung adapter 26 and the tubing assembly 28 in the assembled system 10 can be enhanced by an O-ring (not shown) disposed in a groove in the upper side of the seat ring 128, and a ring 146 mounted atop the ring 128 and held in place by a shoulder 148 formed in the adjacent end of the first connecting tube 100.

In describing the operation of the system 10, it will be contemplated that no liquid has been dispensed from the tank 12 for a period of time sufficient for suspended matter in the liquid in the tank 12 to have settled to lower portions of the tank. As will be clear to those skilled in the art, removal of liquid from the tank 12 under such circumstances would generally result in the withdrawn liquid having a high concentration of particulate matter dependent upon the level in the tank 12 from which the liquid is withdrawn.

With this situation in mind, the operator of the system 10 will initially connect the system to user equipment, for example, a spraying system, via the coupling 74, and will close the valve 68 on the delivery line 70. With the valve closed, the motor 40 of the pump 24 is turned on to commence the operation of the pump 24. As the piston 38 of the pump 24 reciprocates, liquid high in suspended particulate matter will be drawn into the inlet port 44 via the connecting tube 116, the second tubular member 80 and the standpipe 98, and will be forced into the pump outlet port 48 via the checkvalve 54. Since the pump 24 is a constant displacement pump and since the valve 68 is closed, the pressure in the outlet port 48 will increase until it is sufficient to drive the piston 58 away from the seat 60 in the bypass bore 56 so that the liquid will escape about the piston 58 to the recirculation port 64. Continued operation of the pump 24 will then force the liquid through the annulus between the connecting tubes 100 and 116 and thence to the annulus between the tubular members 78 and 80 of the bung adapter 26. Thus, the liquid will be forced out of the lower end 82 of the first tubular member 78 to impinge upon the flange 86 on the second tubular member 80 and be distributed horizontally across upper portions of the tank 12. By such distribution, continued operation of the pump 12 will result in continued withdrawal of particulate rich liquid from lower portions of the tank and mixture of such liquid with particulate deficient liquid near the top of the tank. Thus, by operating the system for a short time with the valve 68 closed, the concentration of particulate material in the liquid can be made uniform. In particular, by operating the system in this manner each time the system is used, the concentration of particulate matter in the liquid can be brought to a level that depends only on the amounts of liquid and particulate material originally placed in the tank. Since these will be known, liquid dispensed from the tank 12 will contain a known quantity of particulate matter.

Once the concentration of particulate matter in the liquid in the tank 12 has become uniform throughout the tank, the mixture can then be dispensed to the user equipment. Should dilution of the liquid be required, as would be the case when the tank 12 contains herbicide, the liquid can be metered into the user equipment for mixture with water or other liquid in an amount that is calculated from the concentration of particulate matter in the liquid in the tank that existed at the time the suspension was introduced into the tank.

It will be clear that the present invention is well adapted to carry out the objects and attain the ends and advantages mentioned as well as those inherent therein. While a presently preferred embodiment of the invention has been described for purposes of this disclosure, numerous changes can be made which will readily suggest themselves to those skilled in the art and which are encompassed within the spirit of the invention disclosed and as defined in the appended claims.

What is claimed is:

1. A system for dispensing a liquid containing suspended particulate matter, comprising:
   a tank for storing the liquid, the tank having a bung for withdrawal of liquid therefrom; and
   liquid delivery means for withdrawing liquid from lower portions of the tank interior and selectively discharging the liquid and returning the liquid to the tank, the liquid delivery means comprising:
      a pump detachably mounted on the tank;
      a bung adapter mounted in the tank bung, the bung adapter comprising:
         a first tubular member sealingly mounted in the bung; and
         a second tubular member mounted within the first tubular member in a substantially concentric relation thereto, whereby the bung adapter provides two fluid flow paths, one through and one about the second tubular member, into the interior of the tank; and
      tubing means, comprising concentric first and second connecting tubes mounted on the pump and mateable with the first and second tubular members of the bung adapter respectively, for providing fluid flow along one flow path from the tank to the pump and fluid flow along the other flow path from the pump to the tank; and
   wherein the system further comprises means for sealing both tubular members against fluid flow at such times that the pump and tubing means are detached from the tank.

2. The system of claim 1 wherein the second tubular member terminates in an upper end within the first tubular member; wherein a seating surface is formed on the inner periphery of the first tubular member above the upper end of the second tubular member; and wherein the means for sealing the tubular members comprises:
   a sealing ring between the upper end of the second tubular member and the seating surface on the inner periphery of the first tubular member, the sealing ring having a central aperture for receiving a portion of the second connecting tube and the second connecting tube having a shoulder formed thereon for engaging portions of the sealing ring about the aperture therethrough and forcing the sealing ring onto the upper end of the second tubular member at such times that the pump and tubing means are mounted on the tank;
   closure means for closing the aperture through the sealing ring and urging the sealing ring against the seating surface on the inner periphery of the first tubular member at such times that the pump and tubing means are detached from the tank.

3. The system of claim 2 wherein the closure means comprises:

a piston mounted in the second tubular member for axial movement through the upper end thereof to engage portions of the underside of the sealing ring about the aperture therethrough; and a spring mounted in the second tubular member for urging the piston against the sealing ring and urging the sealing ring against the seating surface on the inner periphery of the first tubular member.

4. A self-sealing dispensing adapter for a tank having a bung formed through the wall thereof, comprising:

a first tubular member mounted in the bung of the tank;

means for forming an annular seating surface on the inner periphery of the first tubular member;

a second tubular member extending into the first tubular member to terminate in an annular upper end facing the seating surface formed on the inner periphery of the first tubular member and substantially coaxial thereto;

a sealing ring positioned between the seating surface on the inner periphery of the first tubular member and the upper end of the second tubular member, the sealing ring having a central opening formed therethrough substantially coaxial to the seating surface on the first tubular member and the upper end of the second tubular member and the sealing ring having means for alternatively forming a seal with the seating surface formed on the first tubular member and the upper end of the second tubular member; and closure means, mounted in the second tubular member and having a portion extensible from the upper end thereof, for concurrently closing the aperture through the sealing ring and urging the sealing ring against the seating surface formed on the first tubular member.

5. The adapter of claim 4 wherein the closure means comprises:

a piston positioned for axial movement into and out of the upper end of the second tubular member, the piston having sealing means formed thereon to close the aperture through the sealing ring; and a spring mounted in the second tubular member for urging the piston against the sealing ring.

6. The adapter of claim 5 wherein the means for forming an annular seating surface on the inner periphery of the first tubular member is characterized as a ring mounted in one end of the first tubular member and having an internal annular flange overlaying the upper end of the second tubular member.

7. The adapter of claim 4 wherein the means for forming an annular seating surface on the inner periphery of the first tubular member is characterized as a ring mounted in one end of the first tubular member and having an internal annular flange overlaying the upper end of the second tubular member.

* * * * *

UNITED STATES PATENT AND TRADEMARK OFFICE
CERTIFICATE OF CORRECTION

PATENT NO. : 4,856,683

DATED : August 15, 1989

INVENTOR(S) : Brook J. Beaston

It is certified that error appears in the above-identified patent and that said Letters Patent is hereby corrected as shown below:

Column 3, line 43, before "these" delete "caps," and substitute therefor --caps 43,--.

Signed and Sealed this

Twenty-third Day of June, 1992

Attest:

DOUGLAS B. COMER

*Attesting Officer*  *Acting Commissioner of Patents and Trademarks*